Aug. 7, 1951     D. C. ECKENBECK ET AL     2,563,162
METHOD OF MAKING SELF-BINDING NUTS
Filed Nov. 23, 1945     3 Sheets-Sheet 1
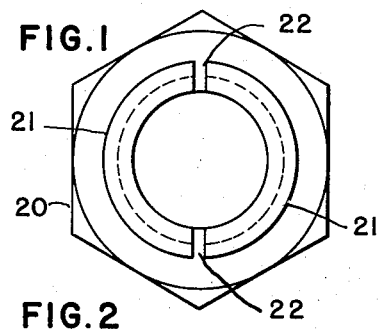
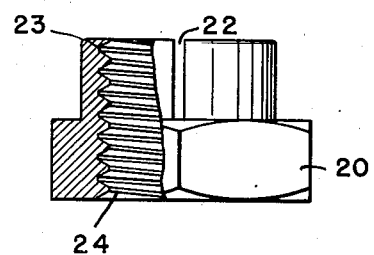
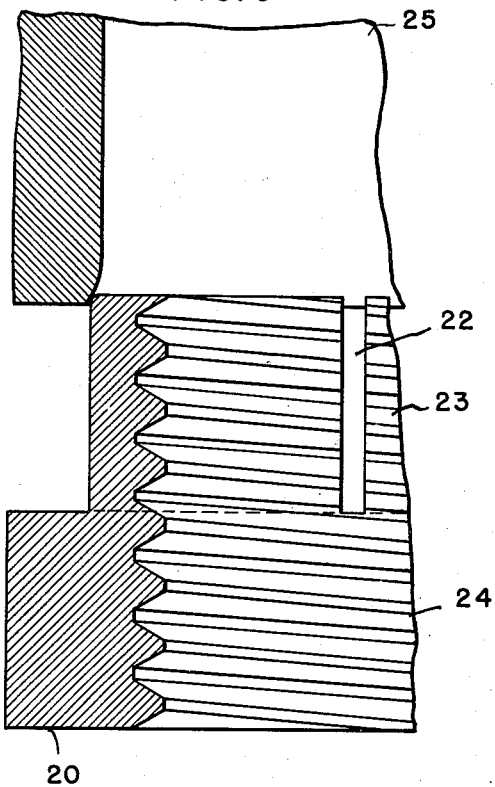
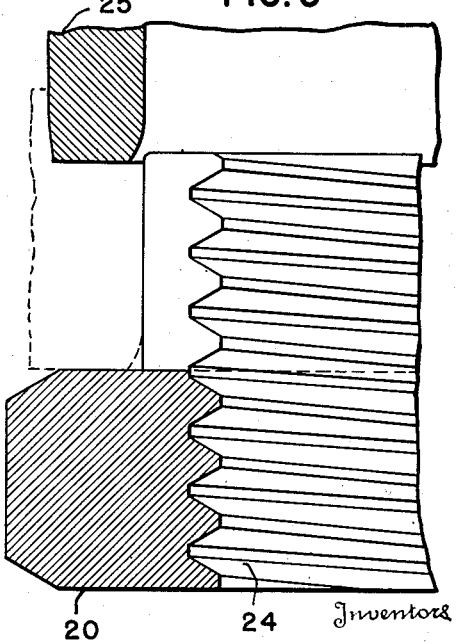
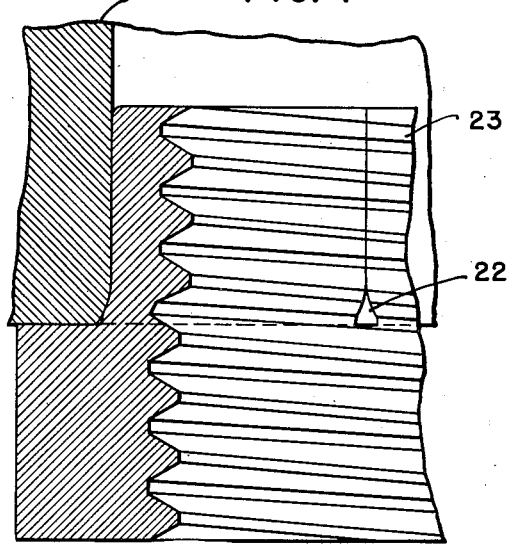
Inventors
Dana C. Eckenbeck and
Philip E. Slaughter
By H. F. Woodward
         Attorney Aug. 7, 1951 — D. C. ECKENBECK ET AL — 2,563,162
METHOD OF MAKING SELF-BINDING NUTS
Filed Nov. 23, 1945 — 3 Sheets-Sheet 2

Inventors
Dana C. Eckenbeck and
Philip E. Slaughter
By H. F. Woodward
Attorney

Aug. 7, 1951  D. C. ECKENBECK ET AL  2,563,162
METHOD OF MAKING SELF-BINDING NUTS
Filed Nov. 23, 1945  3 Sheets-Sheet 3

Inventors
Dana C. Eckenbeck and
Philip E. Slaughter
By H. F. Woodward
Attorney

Patented Aug. 7, 1951

2,563,162

UNITED STATES PATENT OFFICE 2,563,162

METHOD OF MAKING SELF-BINDING NUTS

Dana C. Eckenbeck and Philip E. Slaughter, Minneapolis, Minn.

Application November 23, 1945, Serial No. 630,234

2 Claims. (Cl. 10—86)

This invention relates to attaching or securing elements and relates more particularly to self binding nuts and method of making the same. A general object of this invention is to provide a dependable and effective self binding nut and a simple, economical and commercially practical method for making the same.

Another object of this invention is to provide a novel self binding nut with highly efficient means for maintaining sustained torque between the load taking surfaces of the threads of the nut body and bolt to resist unthreading.

The prior art has long known the lock nut in which various types of detents are used to prevent retrograde movement of the nut. Such devices are efficient for a limited time only for their repeated re-use either damages the thread structure of the bolt or the detents become so dulled as to be worthless for their intended purpose.

Other expedients have been advanced from time to time, one of which is gripping fingers extending from the nut with an inward radial bend part way across at the top of the nut bore so that they are forced apart by the entrant action of a bolt stem. The fingers generally grip the bolt at or near the top only and the fingers soon lose their grip and/or damage the bolt threads prohibiting re-use of the bolt or the nut, or both.

The present invention is designed to overcome the objectionable characteristics of the prior art and at the same time to produce a nut which when threaded over a bolt stem or the like, effectively grips the bolt for a considerable distance without biting thereinto, and with a radial and axial tension supplemented by an annular torque so that the nut binds itself against retrogression of either the nut or the bolt stem.

Still another object of the invention is to provide a self binding nut of the character above stated which may be repeatedly used over and over without appreciable loss of efficiency and without substantially any damage to the threaded structure of either the nut or the stud.

The various objects and features of our invention will be understood from the following detailed description of a preferred form of the self binding nut and means for carrying out the method of the invention, but it is to be understood that the details may be varied within the scope of the invention as claimed.

The invention will be described with reference to the accompanying drawing, in which like reference numerals denote like parts, and in which:

Figure 1 is a top plan view of a nut made in accordance with the invention, prior to distortion of the gripping members.

Figure 2 is an elevation partly in section of the nut;

Figure 3 is an elevation in section illustrating the nut entering the forming tool on the short axis of such tool;

Figure 4 is an elevation in section showing the nut completely in the forming tool on the short axis;

Figure 5 is an elevation in section showing the entering of the forming tool on the wide axis in full lines and completely in the forming tool on the wide axis in dotted lines;

Figure 6:
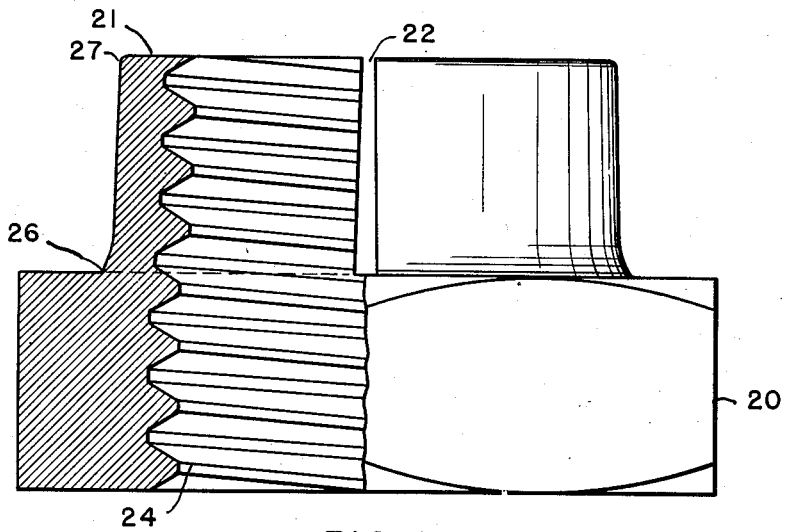
Figure 6 is an elevation partly in section of the completed nut showing the shape of the holding members on the short axis.

A nut made in accordance with this invention comprises, a body 20, which may have a hexagonal shape, having an axial bore extending therethrough from its top to its bottom. The top face is provided with gripping members 21.

One suitable way of forming the holding members is by providing a reduced axial extension on the top of the nut and then slotting the extension at a plurality of points as shown in Figure 1. The slots 22 extend from the outer end of the extension to the top face portion of the nut but preferably not into the nut.

In producing the nut, the blank with its integral extensions is bored, threaded, and slotted, or slotted and threaded for the entire axial extent of the resulting bore as shown in Figure 2. This provides the holding members with arcuate inner faces 23 threaded in continuation of the nut bore threads 24 and at the same helix angle, the curvature of the inner surface 23 of the holding members being substantially in the radius of the nut bore.

Figure 7:
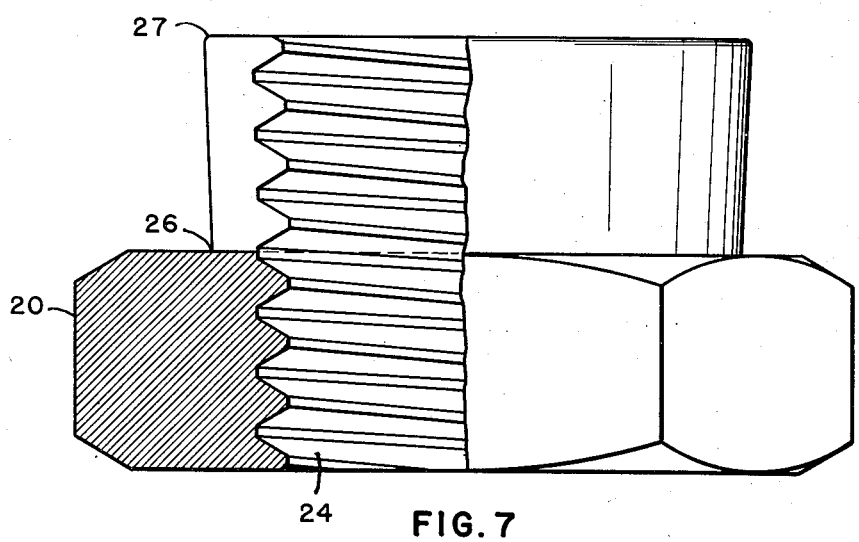
Figure 7 is an elevation partly in section of the completed nut showing the shape of the holding members on the wide axis.

After the initial formation of the nut as shown in Figures 1 and 2, the holding members are distorted as shown in Figures 6 and 7. This is accomplished by bending the holding members to the form of substantially an ellipse at their free ends. The gripping members 21 are distorted from the free end to substantially the bottom of the said members 21.

As shown in Figures 6 and 7 this bending operation disposes the inner threaded faces of the holding members on the short axis at an incline upwardly and inwardly to the axis of the nut.

The distortion of the nut holding members 21 is preferably accomplished by pressure application thereover of a forming tool. As shown in Figures 3, 4 and 5, the tool comprises a punch having a substantially elliptical bore. In the operation of deforming the nut holding members, the punch is forced down axially over the nut holding members, as indicated in Figures 3, 4, and 5, and whereupon the members 21 will be given their peculiar deformation.

Nuts constructed in accordance with this invention when applied over and threaded home on bolt stems and the like, are effectively thread locked thereon with a firm self binding action under sustained torque of the holding members for substantially the full length of the holding members.

Figures 6 and 7 show that the members 21 are circular at their base 26 or where they join the base 20 and the upper edge 27 is in the form of an ellipse.

Figure 8:
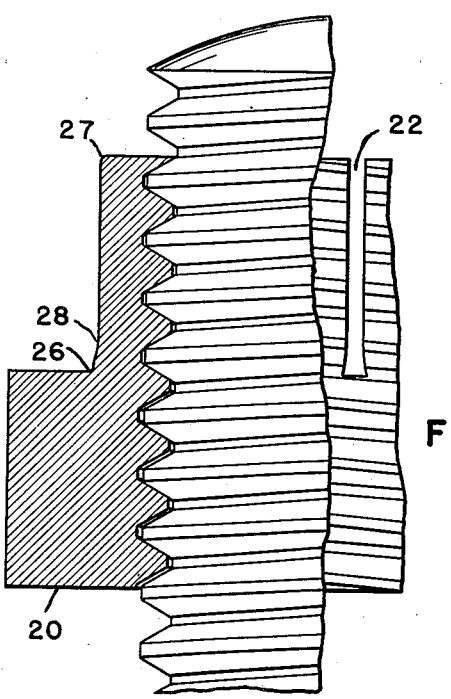
Figure 8 is an axial section through a nut and bolt associated in service.

Figure 8 discloses that the holding members are distorted substantially their full length and that the holding members are elliptical from about position indicated at 28 to the free ends. In Figure 8 the fit between the stud and nut by way of example, may be class 3 standard in the body 20; and in the members 21 the fit may be tighter than class 4 but may be controlled.

Figure 9:
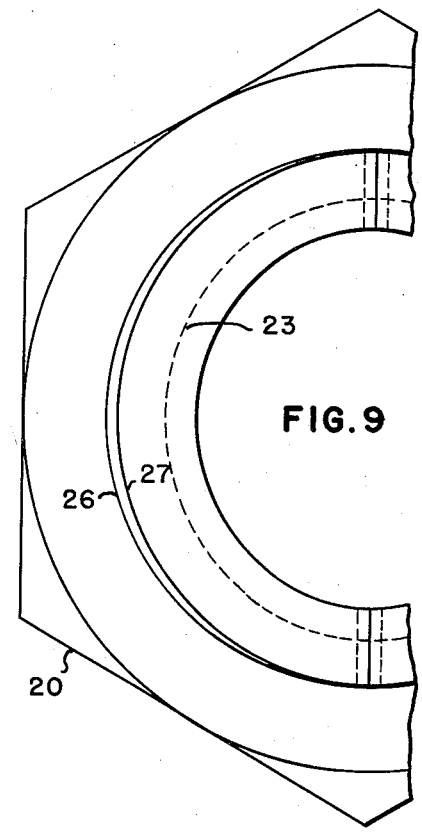
Figure 9 is a top plan view with parts broken away of the shape of the nut when completely in the forming tool.
Figure 10:
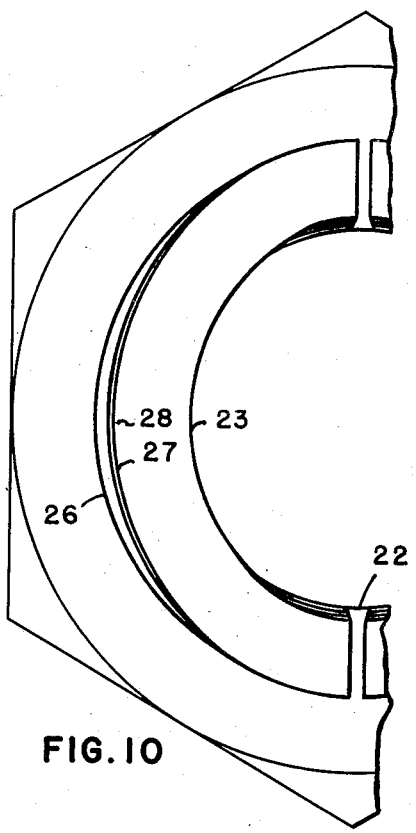
Figure 10 is a top plan view with parts broken away of the nut after being deformed.

When the member 21 is forced into the form 25, it assumes the position shown in Figure 9. When the forming tool is removed the member 21 assumes the position shown in Figure 10, looking down vertically towards the locking portion of the fastener.

In views 1 and 2, the sides of the split cylinder are substantially parallel and substantially are vertical to the nut body faces. The sides are parallel also to the pitch line of the threads therein. The threads are made in line with a standard tap or some other means giving a standard thread. The forming tool, of suitable construction to give the desired torque, is pressed down vertically to the nut body faces, over the split cylinder. While the split cylinder is in the forming tool, the split portions conform to the internal form of the tool. It is important that the slots be positioned substantially on the long axis of the forming tool. What might be termed the edges of the slot or slots are pulled away from the arc of the normal helix and/or pitch line so there is a definite and maximum binding on the short axis, the approximate mid-point between the slots.

In the formed nut there is a minor but highly important thread deformation such that the threads at the outer face of the locking neck are closer on pitch than when threaded; this condition decreases as the top of the nut body is approached. There is a progressive lead and helix warp present which has the straightest lead and helix at the outer face of the locking neck and the shortest as it approaches the nut body.

The displacement of the threads on the inner faces of the members 21, as best shown in Figures 6 and 7 with respect to the threads 24 of the nut bore, sets up an axial tension and gives the proven locking effect.

The relative offsetting of the threads effected between adjacent edges of the holding members is an important feature of the invention, as it provides for a clamping tension of the holding members on the side faces of the mating threads of a bolt stem when the nut is applied.

In applications where great resistance to vibratory loosening is essential, or where a definite amount of torque in inch or foot pounds is required, or where constant or frequent disassembly is contemplated, applicants' self-binding nut gives completely satisfactory results.

With applicants' device comparatively accurate torque of any practical degree may be obtained.

There are several variables in this torque, viz: (a) the length of the torque neck; (b) the wall thickness of the torque neck; (c) the width of the slot in the torque neck; (d) the amount of compression of the torque neck, etc. The torque neck is substantially compressed at the base to a tight thread, and this compression increases progressively to a substantially greater tightness at the top on the short axis. This procedure provides a gripping action on the bolt for substantially the entire length of the torque neck, and exerts tensional pressure by the bolt on the threads of the nut body. Since this torque neck is a varying oval in shape after compression, and because the slot is coaxial to the long axis of the varying oval (Figures 6, 7 and 10), the slots are relieved from thread cutting. Because the varying oval torque neck is slotted, it has varying spring action, and therefore retains its torque strength throughout repeated insertions of the bolt. The use of properly heat treated steel gives great life to this torque. This torque is not noticeably affected by a reasonable amount of heat, cold, grease or water on the bolt. Also the bolt may be well started by hand, and the action of the torque neck is a gradual but increasingly gripping force.

The relative offsetting of the threads between the leading edges of the holding members and the trailing edges provides for a clamping tension of the holding members on the side faces of the mating threads of a bolt stem for substantially the entire length of the holding members, when the nut is applied.

What we claim is:

1. The method of manufacturing a self-binding nut comprising forming a nut blank with a reduced substantially cylindrical portion extending from an enlarged base portion, forming a circular bore through said base portion and said reduced portion and concentric with said reduced portion, then threading the circular bore of the base and the reduced portion, forming a pair of diametrically opposed slots substantially the length of the reduced portion, deforming said reduced portion into substantially elliptical shape by forcing over the reduced portion a forming tool having an elliptical opening therein with the narrow axis of said elliptical opening less than the outside diameter of the reduced portion, said forming tool being forced over the reduced portion for substantially its full length, with the short axis of the tool opening being substantially perpendicular to a line between the slots and with the long axis of the opening in the forming tool substantially co-axial to the slots in reduced portion.

2. The method of manufacturing a self-binding nut comprising forming a nut blank with a reduced substantially cylindrical portion extending from an enlarged base portion, forming a circular bore through said base portion and said reduced portion and concentric with said reduced portion, forming a pair of diametrically opposed slots substantially the length of the reduced portion, then threading the circular bore of the base and the reduced portion, deforming said reduced portion into substantially elliptical shape by forcing over the reduced portion a forming tool having an elliptical opening therein, with the narrow axis of said elliptical opening less than the outside diameter of the reduced portion, said forming tool being forced over the reduced portion for substantially its full length, with the short axis of the tool opening substantially perpendicular to a line between the slots and with the long axis of the opening in the forming tool substantially co-axial to the slots in reduced portion.

DANA C. ECKENBECK.
PHILIP E. SLAUGHTER.

REFERENCES CITED

The following references are of record in the file of this patent:

UNITED STATES PATENTS

| Number | Name | Date |
|---|---|---|
| Re. 22,243 | Gade | Jan. 5, 1943 |
| 219,783 | Vaughan | Sept. 16, 1879 |
| 332,540 | Law | Dec. 15, 1885 |
| 1,263,061 | Hibbard | Apr. 16, 1918 |
| 1,692,497 | Furlan | Nov. 20, 1928 |
| 2,007,293 | Cayouette | July 9, 1935 |
| 2,255,286 | Harvey | Sept. 9, 1941 |
| 2,290,270 | Brackett | July 21, 1942 |
| 2,333,290 | Brackett | Nov. 2, 1943 |
| 2,337,797 | Brackett | Dec. 28, 1943 |
| 2,349,513 | Mortus | May 23, 1944 |

FOREIGN PATENTS

| Number | Country | Date |
|---|---|---|
| 327,289 | Great Britain | Apr. 3, 1930 |
| 12,348 | Germany | Feb. 19, 1881 |
| 710,959 | France | June 16, 1931 |